(12) United States Patent
Futa, Jr. et al.

(10) Patent No.: US 10,850,831 B2
(45) Date of Patent: Dec. 1, 2020

(54) PROPELLER PITCH CONTROL SYSTEM FOR AIRCRAFT TURBOPROP ENGINES

(71) Applicant: HONEYWELL INTERNATIONAL INC., Morris Plains, NJ (US)

(72) Inventors: Paul W. Futa, Jr., North Liberty, IN (US); Sammuel Tillich, South Bend, IN (US); Steven Alan Lewis, South Bend, IN (US); Christopher Douglas Eick, Phoenix, AZ (US); Donald Striker, Chandler, AZ (US); Michael Albert McPherson, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 159 days.

(21) Appl. No.: 16/230,201

(22) Filed: Dec. 21, 2018

(65) Prior Publication Data

US 2020/0198764 A1    Jun. 25, 2020

(51) Int. Cl.
*B64C 11/40* (2006.01)
*B64C 11/30* (2006.01)
*B64C 11/38* (2006.01)

(52) U.S. Cl.
CPC ............ *B64C 11/40* (2013.01); *B64C 11/303* (2013.01); *B64C 11/305* (2013.01); *B64C 11/38* (2013.01)

(58) Field of Classification Search
CPC ....... B64C 11/40; B64C 11/305; B64C 11/38; B64C 11/303
See application file for complete search history.

(56) References Cited

U.S. PATENT DOCUMENTS

| 3,583,828 | A | * | 6/1971 | White | B64C 11/303 |
| | | | | | 416/38 |
| 3,973,873 | A | * | 8/1976 | Shank | B64C 11/40 |
| | | | | | 416/43 |
| 4,946,354 | A | * | 8/1990 | Aubry | B64C 27/54 |
| | | | | | 416/157 A |
| 5,174,718 | A | | 12/1992 | Lampeter et al. | |
| 5,364,231 | A | * | 11/1994 | Eick | B64C 11/38 |
| | | | | | 416/157 R |
| 6,059,528 | A | | 5/2000 | Danielson et al. | |
| 6,481,720 | B1 | * | 11/2002 | Yoshida | B63H 23/321 |
| | | | | | 277/400 |

(Continued)

FOREIGN PATENT DOCUMENTS

| RU | 2108268 C1 | * | 4/1998 | ............. B64C 11/40 |
| WO | WO-9717252 A1 | * | 5/1997 | ............. B64C 11/40 |

*Primary Examiner* — Moshe Wilensky
*Assistant Examiner* — Brian Christopher Delrue
(74) *Attorney, Agent, or Firm* — Lorenz & Kopf, LLP

(57) ABSTRACT

A propeller pitch control system for a turboprop engine of an aircraft includes an engine control unit and a pitch control unit. The engine control unit is operable to determine a phase of flight of the aircraft and is configured to supply control commands. The pitch control unit is coupled to receive the control commands from the engine control unit and includes a housing, a beta piston, a position sensor, a beta tube, and an electrohydraulic valve. The engine control unit only commands the electrohydraulic valve to move the beta piston from the fully retracted position when the engine control unit determines the aircraft is conducting pre-takeoff roll taxiing operations or is conducting post landing touchdown operations.

20 Claims, 7 Drawing Sheets

(56) References Cited

U.S. PATENT DOCUMENTS

| | | | | |
|---|---|---|---|---|
| 7,758,310 B2* | 7/2010 | Cotton | ............... | B64C 27/14 |
| | | | | 416/157 R |
| 8,946,916 B2* | 2/2015 | Tarnowski | ............ | F03D 7/0276 |
| | | | | 290/44 |
| 10,472,050 B2* | 11/2019 | Futa, Jr. | ............... | B64C 11/385 |
| 10,577,078 B2* | 3/2020 | Chapman | ............... | G01P 3/481 |
| 2003/0197504 A1* | 10/2003 | Gray | ............... | F15B 15/2861 |
| | | | | 324/207.24 |
| 2004/0222788 A1* | 11/2004 | Low | ............... | F16F 9/3292 |
| | | | | 324/207.22 |
| 2010/0282068 A1* | 11/2010 | Cani | ............... | F15B 15/2876 |
| | | | | 91/1 |
| 2012/0234285 A1* | 9/2012 | Venugopal | ............ | F02B 23/0669 |
| | | | | 123/193.6 |
| 2013/0323050 A1 | 12/2013 | Kleckler | | |
| 2015/0139798 A1* | 5/2015 | Duke | ............... | B64C 11/301 |
| | | | | 416/1 |
| 2016/0083077 A1* | 3/2016 | Rawdon | ............... | B64C 11/00 |
| | | | | 416/148 |
| 2016/0244149 A1* | 8/2016 | Carrington | ............... | B64C 11/40 |
| 2017/0248085 A1* | 8/2017 | Carrington | ............... | B64C 11/30 |
| 2018/0057146 A1* | 3/2018 | Futa, Jr. | ............... | B64C 27/64 |
| 2018/0306053 A1* | 10/2018 | Chapman | ............... | B64C 11/06 |
| 2019/0031319 A1* | 1/2019 | Calkins | ............... | B64C 11/44 |
| 2019/0389562 A1* | 12/2019 | Garabello | ............... | B64C 11/385 |
| 2020/0198765 A1* | 6/2020 | Futa, Jr. | ............... | F02D 29/02 |

* cited by examiner

US 10,850,831 B2

PROPELLER PITCH CONTROL SYSTEM FOR AIRCRAFT TURBOPROP ENGINES

TECHNICAL FIELD

The present invention generally relates to aircraft turboprop engines, and more particularly relates to a propeller pitch control system for aircraft turboprop engines.

BACKGROUND

Some fixed-wing aircraft include one or more propellers driven by a gas turbine engine. Such aircraft may include a hydraulically actuated propeller pitch control actuation system that is configured to adjust and maintain a pitch of the propeller blades. Generally, the pitch of the propeller blades corresponds to an amount of thrust generated by the propeller blades.

Historically (e.g., for over fifty years), turboprop engine propeller pitch has been controlled using mechanical flyweight governors. Although generally robust, these mechanical governors do exhibit certain drawbacks. For example, these governors can exhibit relatively poor engine speed accuracy (e.g., engine speed drift due to oil temperature or airspeed), and engine speed control transient overshoots (due to lack of anticipation functionality and mechanical dynamics required for speed stability). In addition, engine speed control relies on relatively complex mechanical linkages to vary the speed set point of the governor. Additionally, these mechanical governors require routine maintenance to adjust speed set points.

Hence, there is a need for a propeller pitch control system that does not use mechanical flyweight governors, and thus exhibits greater engine speed accuracy, reduces the likelihood for engine speed control transient overshoots, does not rely on relatively complex mechanical linkages, and does not require the same amount of routine maintenance as conventional governors. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a propeller pitch control system for a turboprop engine of an aircraft includes an engine control unit and a pitch control unit. The engine control unit is operable to determine a phase of flight of the aircraft and is configured to supply control commands. The pitch control unit is coupled to receive the control commands from the engine control unit and includes a housing, a beta piston, a position sensor, a beta tube, and an electrohydraulic valve. The housing includes an inlet port, a drain pressure port, a control pressure chamber, and a piston sleeve. The inlet port is for receiving hydraulic fluid, and the drain pressure port is vented to atmospheric pressure. The beta piston is disposed within the piston sleeve and is axially movable therein between a fully extended position and a fully retracted position. The beta piston has a first end section, a second end section, an inner surface, an outer surface, and a control pressure port. At least a portion of the second end section is disposed within the control pressure chamber. The second end section has an outer surface and is frustoconical in cross-section. The inner surface defines a beta tube control volume, and the control pressure port extends between the inner surface and the outer surface and fluidly communicates the inlet port with the beta tube control volume. The position sensor has a sensor housing and a sensor shaft. The shaft extends from, and is movable relative to, the housing and is spring biased to continuously engage the outer surface of the second end section, whereby axial movement of the second end section causes the sensor shaft to move relative to the sensor housing. The beta tube is disposed within the beta tube control volume and is rotatable relative to the beta piston. The beta tube is axially movable in the beta tube control volume based, at least in part, on fluid pressure within the beta tube control volume. The electrohydraulic valve is coupled to the housing and includes a supply nozzle, a drain nozzle, a control pressure port, a movable flapper disposed between the supply nozzle and the drain nozzle, and a torque motor coupled to the flapper. The supply nozzle is in fluid communication with the inlet port, the drain nozzle is in fluid communication with the drain pressure port, and the control pressure port is in fluid communication with the control pressure chamber. The torque motor is coupled to receive commands from the engine control unit and is responsive to the commands to move the flapper between the supply nozzle and the drain nozzle to modulate fluid pressure in the control pressure chamber, to thereby move the beta piston to the fully extended position, the fully retracted position, or any one of numerous positions between the fully extended and fully retracted positions. When the beta piston is in the fully retracted position, the second end section engages a wall of the control pressure chamber. The engine control unit only commands the electrohydraulic valve to move the beta piston from the fully retracted position when the engine control unit determines the aircraft is conducting pre-takeoff roll taxiing operations or is conducting post landing touchdown operations.

In another embodiment, a propeller pitch control system for a turboprop engine of an aircraft includes an engine control unit and a pitch control unit. The engine control unit is operable to determine a phase of flight of the aircraft and is configured to supply control commands. The pitch control unit is coupled to receive the control commands from the engine control unit and includes a housing, a beta piston, an anti-rotation pin, a position sensor, a beta tube, and an electrohydraulic valve. The housing has a slot formed therein and includes an inlet port, a drain pressure port, a control pressure chamber, and a piston sleeve. The inlet port is for receiving hydraulic fluid, and the drain pressure port is vented to atmospheric pressure. The beta piston is disposed within the piston sleeve and is axially movable therein between a fully extended position and a fully retracted position. The beta piston has a first end section, a second end section, an inner surface, an outer surface, and a control pressure port. At least a portion of the second end section is disposed within the control pressure chamber. The second end section has an outer surface and is frustoconical in cross-section. The inner surface defines a beta tube control volume, and the control pressure port extends between the inner surface and the outer surface and fluidly communicates the inlet port with the beta tube control volume. The anti-rotation pin is coupled to the second end section of the beta piston and extends into the slot, whereby rotation of the beta piston is prevented. The position sensor has a sensor housing and a sensor shaft. The shaft extends from, and is movable relative to, the housing and is spring biased to continuously engage the outer surface of the second end section, whereby axial movement of the second end section causes the sensor shaft to move relative to the sensor housing. The beta tube is disposed within the beta tube control volume and is rotatable relative to the beta piston. The beta tube is axially movable in the beta tube control volume based, at least in part, on fluid pressure within the beta tube control volume. The electrohydraulic valve is coupled to the housing and includes a supply nozzle, a drain nozzle, a control pressure port, a movable flapper disposed between the supply nozzle and the drain nozzle, and a torque motor coupled to the flapper. The supply nozzle is in fluid communication with the inlet port, the drain nozzle is in fluid communication with the drain pressure port, and the control pressure port is in fluid communication with the control pressure chamber. The torque motor is coupled to receive commands from the engine control unit and is responsive to the commands to move the flapper between the supply nozzle and the drain nozzle to modulate fluid pressure in the control pressure chamber, to thereby move the beta piston to the fully extended position, the fully retracted position, or any one of numerous positions between the fully extended and fully retracted positions. The beta piston, the piston sleeve, and the beta tube are configured to form a half-area force balanced architecture. When the beta piston is in the fully retracted position, the second end section engages a wall of the control pressure chamber. The engine control unit only commands the electrohydraulic valve to move the beta piston from the fully retracted position when the engine control unit determines the aircraft is conducting pre-takeoff roll taxiing operations or is conducting post landing touchdown operations.

In yet another embodiment, a propeller pitch control unit includes a housing, a beta piston, and a beta tube. The housing includes an inlet port, a drain pressure port, a control pressure chamber, and a piston sleeve. The inlet port is for receiving hydraulic fluid, and the drain pressure port is vented to atmospheric pressure. The beta piston is disposed within the piston sleeve and is axially movable therein between a fully extended position and a fully retracted position. The beta piston has an outer diameter ($D_{BP\_OUTER}$) that defines a first area ($A_1$) and includes a first end section, a second end section, an inner surface, an outer surface, and a control pressure port. At least a portion of the second end section is disposed within the control pressure chamber. The inner surface defines a beta tube control volume, and the control pressure port extends between the inner surface and the outer surface and fluidly communicates the inlet port with the beta tube control volume. The beta tube is disposed within the beta tube control volume and is rotatable relative to the beta piston. The beta tube is axially movable in the beta tube control volume based, at least in part, on fluid pressure within the beta tube control volume. The beta tube has an outer diameter ($D_{BT\_OUTER}$) that defines a second area ($A_2$). The difference between the first area ($A_1$) and the second area ($A_2$) is approximately equal to a third area ($A_3$), and the third area ($A_3$) is equal to the second area ($A_2$).

Furthermore, other desirable features and characteristics of the propeller oil control unit will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
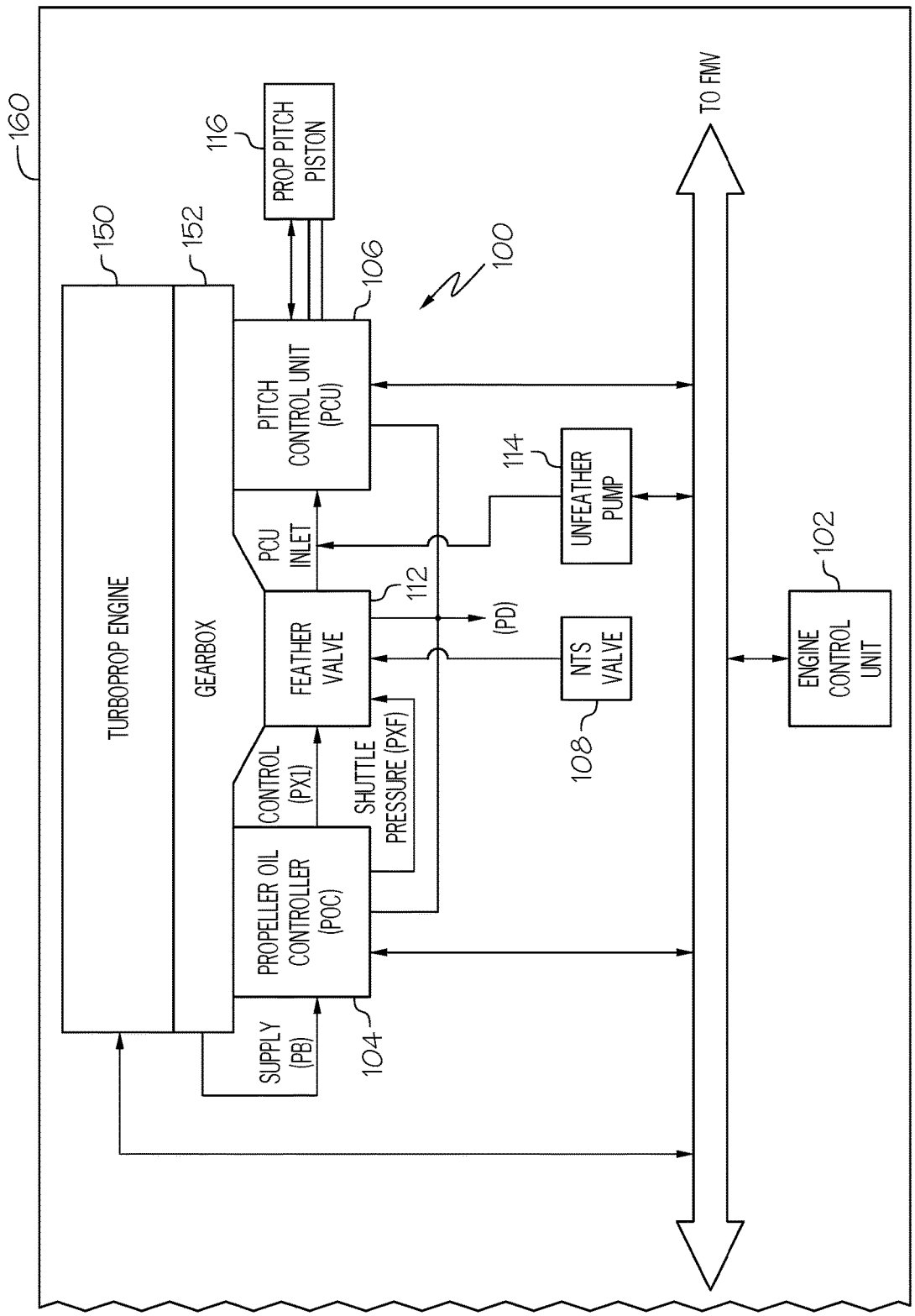
FIG. 1 depicts a functional block diagram of one embodiment of a propeller pitch control system.

Referring first to FIG. 1, a functional block diagram of one embodiment of a turboprop engine propeller pitch control system 100 is depicted. The depicted system 100, which is used in conjunction with a turboprop engine 150 that is mounted on an aircraft 160, includes at least an engine control unit 102, a propeller oil controller 104, and a pitch control unit 106. As FIG. 1 further depicts, the system 100, or at least portions thereof, may be mounted on or within the gearbox 152 of the turboprop engine 150. The depicted system 100 may also include a negative torque sensor valve 108, a feather valve 112, and an unfeather pump 114. For completeness, a brief description of these additional, optional components and associated functions will be described further below.

The engine control unit 102 is in operable communication with the propeller oil controller 104 and the pitch control unit 106, and it is also in operable communication with the turboprop engine 150. The engine control unit 102 may be implemented as any one of numerous types of engine control units such as, for example, an electronic engine controller (EEC) or a full-authority digital engine controller (FADEC). Regardless of how it is specifically implemented, the engine control unit 102 is configured to implement control and monitoring of the turboprop engine 150. In particular, the engine control unit 102 controls fuel flow to the turboprop engine 150, via a non-illustrated fuel metering valve (FMV), to thereby control engine power generation. The engine control unit 102 simultaneously supplies control commands to, and thus controls the operations of, both the propeller oil controller 104 and the pitch control unit 106 to thereby control engine rotational speed.

The propeller oil controller 104 is coupled to receive a supply of oil at a supply pressure (PB) and is configured to discharge the oil at a discharge oil pressure (PX1). The supply of oil may come from any one of numerous sources, but in the depicted embodiment the source is the engine gearbox 152. The propeller oil controller 104 is further coupled to receive control commands from the engine control unit 102 and is configured, in response to the control commands, to control the discharge oil pressure (PX1).

The propeller pitch control unit 106 is coupled to receive the pressurized oil discharged from the propeller oil control unit 104. The propeller pitch control unit 106 is also coupled to receive control commands from the engine control unit 102. The propeller pitch control unit 106 is configured, in response to the control commands it receives, to control the position of a non-illustrated beta piston, which in turn controls the position of a propeller pitch piston 116, and thus propeller blade angle.

The rotational speed and power of the turboprop engine 150 are based, at least in part, on pilot commanded speed and power lever angle (PLA). The engine control unit 102 receives and processes the pilot commanded speed and PLA, together with various additional inputs and, in response to these inputs, generates the commands that control fuel flow, the propeller oil controller 104, and the propeller pitch control unit 106, to produce the requested engine speed and power. Although the various additional inputs may vary, in the depicted embodiments these inputs include, for example fuel metering valve position, engine speed, various pressures, and pitch control unit position.

The engine control unit 102 is also operable to determine a flight phase of the aircraft 160 and is configured to supply the control commands to the propeller oil controller 104 and to the pitch control unit 106 based at least in part on the determined phase of flight. Specifically, when the engine control unit 102 determines the aircraft is conducting specific ground operations, such as pre-takeoff roll taxiing operations or post-landing touchdown operations, the propeller oil controller 104 is commanded by the engine control unit 102 to supply pressurized fluid (e.g., oil) to the pitch control unit 106. The pitch control unit 106 is in turn commanded by the engine control unit 102 to modulate fluid flow to control the position of a propeller pitch piston 116, and thus the propeller blade angle. When the engine control unit 102 determines the aircraft is either conducting a take-off roll or is in flight, the pitch control unit 106 is basically inactive, providing only a minimum propeller pitch stop. However, the propeller oil controller 104 is commanded by the engine control unit 102 to modulate fluid flow to control the position of a propeller pitch piston 116, and thus the propeller blade angle.

The propeller oil controller 104 and the pitch control unit 106 may be variously configured to implement the above-described functions. One particular embodiment of the propeller oil controller 104 will be described momentarily. Before doing so, however, a brief description of the previously mentioned additional, optional components—the negative torque sensor valve 108, the feather valve 112, and the unfeather pump 114—and associated functions will first be provided.

The negative torque sensor valve 108, when included, is a hydro-mechanically controlled valve that senses negative torque of the propeller. Should unintended negative torque occur, the negative torque sensor valve 108, in conjunction with a non-illustrated orifice pack, will position the feather valve 112 to block the output pressure of the propeller oil controller 104 (PX1) and reduce the PCU inlet pressure by venting it to drain pressure (PD). As a result, propeller pitch is moved to an increased forward thrust angle, thereby eliminating unintended negative propeller blade torque.

The feather valve 112, when included, is disposed between the propeller oil controller 104 and the pitch control unit 106 and, as just described, can be positioned in response to the negative torque sensor valve 108. As will be briefly mentioned further below, the feather valve 112 can also be positioned independently of the negative torque sensor valve 108, via commands from the pilot, to vent the output pressure of the propeller oil controller 104 (PX1) to drain pressure (PD). This allows the pilot to controllably increase the propeller pitch to a greater forward thrust angle and, if needed, all the way to a feather pitch angle. As is generally known, feather pitch aligns the blade pitch to the direction of flight, so the blade will produce minimal drag if the engine 150 is shut down in flight.

The unfeather pump 114 is only activated and operated when the engine 150 is not running. When activated, the unfeather pump 114 supplies pressurized fluid (e.g., oil) to the system 100 to build up the system fluid pressures. Though not depicted in FIG. 1, the fluid discharged from the unfeather pump 114 preferably passes through a check valve. This prevents the backflow of pressurized fluid through the pump 114 when it is not in operation.

Having described the overall system 100, including the additional, optional components, one embodiment of the pitch control unit 106 will now be described. In doing so, reference should now be made to FIG. 2, which depicts a schematic representation of one embodiment of a pitch control unit 106. The depicted pitch control unit 106 includes at least a housing 202, a beta piston 204, a position sensor 206, a beta tube 208, and an electrohydraulic valve (EHV) 210.

The housing 202 includes at least an inlet port 212, a drain pressure port 214, a control pressure chamber 216, and a piston sleeve 218. The inlet port 212 receives the pressurized oil discharged from the propeller oil controller 104 (PX2), and the drain pressure port 214 is vented to atmospheric pressure (PD). It is noted that the depicted housing 202 also includes a lockout pressure port 222. This port 222, when included, is coupled to a negative torque sense pressure, and its purpose is described further below.

The beta piston 204 is disposed within the piston sleeve 218 and is axially movable therein between a fully extended position and a fully retracted position. The piston sleeve 218 pilots the beta piston 204 with a relatively tight matched diametrical clearance (e.g., 0.0004") to minimize leakage. This relatively tight clearance also eliminates the need for diametrical seals on the beta piston 204, which significantly reduces drag and hysteresis, thereby contributing to decreased component size.

Figure 2:
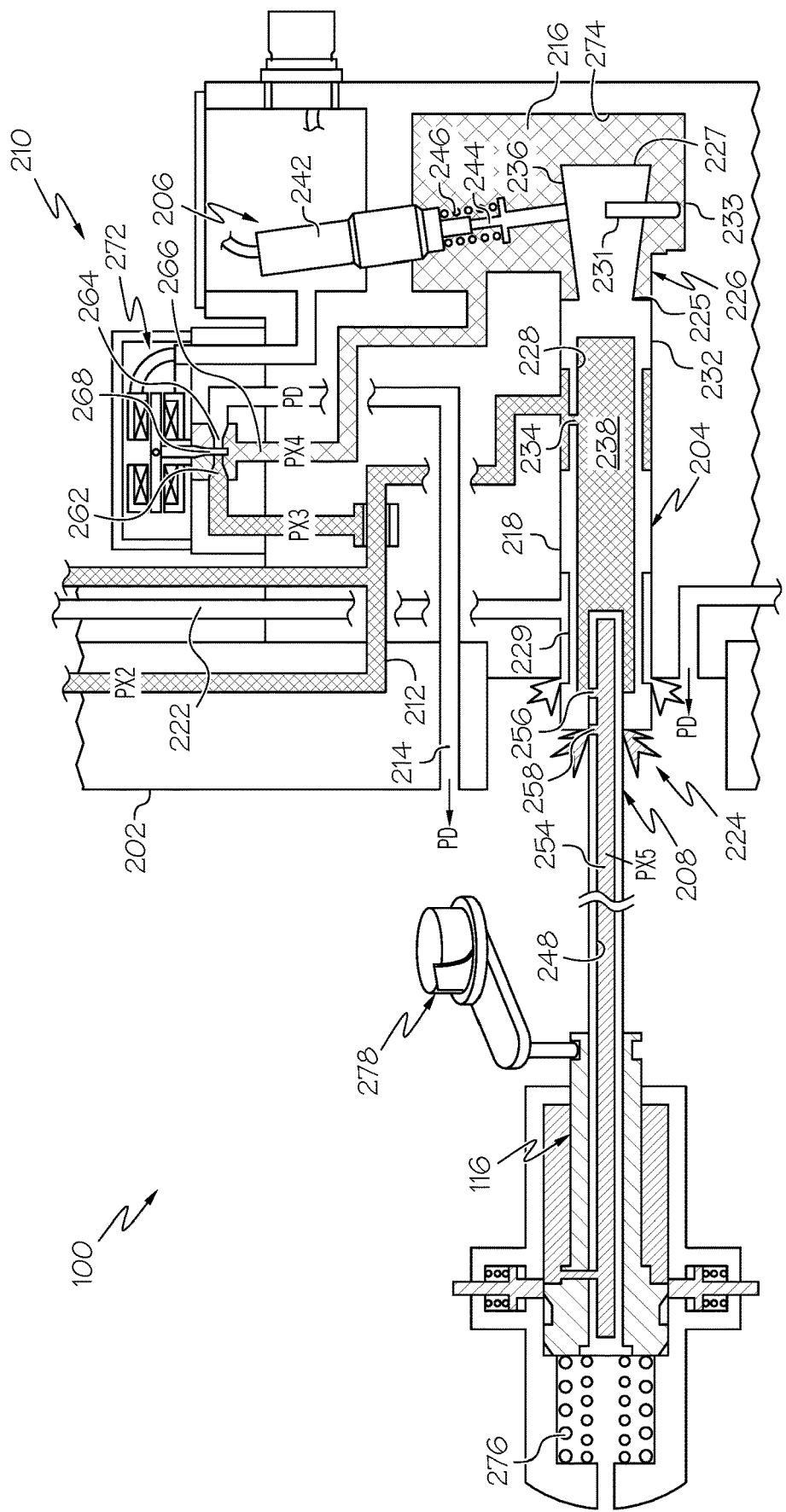
FIG. 2 depicts a schematic representation of one embodiment of a propeller pitch control unit that may be used to implement the propeller pitch control system depicted in FIG. 1.

The beta piston 204 has a first end section 224, a second end section 226, an inner surface 228, an outer surface 232, and a control pressure port 234. The inner surface 228 defines a beta tube control volume 238, and the control pressure port 234 extends between the inner surface 228 and the outer surface 232 and fluidly communicates the inlet port 212 with the beta tube control volume 238. As depicted in FIG. 2, the second end section 226 is disposed within the control pressure chamber 216. The second end section 226 has an outer surface 236 and is frustoconical in cross-section. More specifically, the second end section 226 is defined by a first frustoconical end 225 and a second frustoconical end 227, and the second end section 226 increases in diameter from the first frustoconical end 225 to the second frustoconical end 227.

The beta piston 204, at least in the depicted embodiment, also includes a lockout pressure groove 229 and an anti-rotation pin 231. The lockout pressure groove 229 is formed in the outer surface 232 of the beta piston 204 and is in fluid communication with the lockout pressure port 222. As will be described further below, the lockout pressure groove 229 selectively vents the lockout pressure port 222 to atmospheric pressure.

Rotation of the beta piston 204 is not desired. Thus, it is prevented. To do so, a slot 233 is formed in the housing, and the anti-rotation pin 231, which is coupled to the second end section 226 of the beta piston 204, extends into the slot 233. This pin-and-slot configuration allows axial movement of the beta piston 204 within the housing 202, while simultaneously preventing rotational movement of the beta piston 204.

The position sensor 206 includes a sensor housing 242 and a sensor shaft 244. The sensor shaft 244 extends from, and is movable relative to, the housing 242, and is spring biased, via a sensor spring 246, to continuously engage the outer surface of the second end section 226. As a result, axial movement of the second end section 226 causes the sensor shaft 244 to move relative to the sensor housing 242. The position sensor 206 may be implemented using any one of numerous sensor devices that can translate sensor shaft movement to position of the beta piston 204. In the depicted embodiment, the position sensor 206 is implemented using a linear variable differential transformer (LVDT) sensor, and more specifically a dual-channel LVDT sensor.

The beta tube 208 is partially disposed within the beta tube control volume 238 and extends from an opening formed in the first end section 224 of the beta piston 204, and into the propeller pitch piston 116. The beta tube 208 is rotatable relative to the beta piston 204 and is axially movable in the beta tube control volume 238. The beta tube 208, at least in the depicted embodiment, includes an inner surface 248 and an outer surface 252. The inner surface 248 defines a propeller pitch control volume 254. A first aperture 256, which is disposed at a first axial position on the beta tube 208, extends between the inner surface 248 and the outer surface 252. A second aperture 258, which is disposed at a second axial position on the beta tube 208 that is spaced apart from the first axial position, also extends between the inner surface 248 and the outer surface 252.

Figure 3:
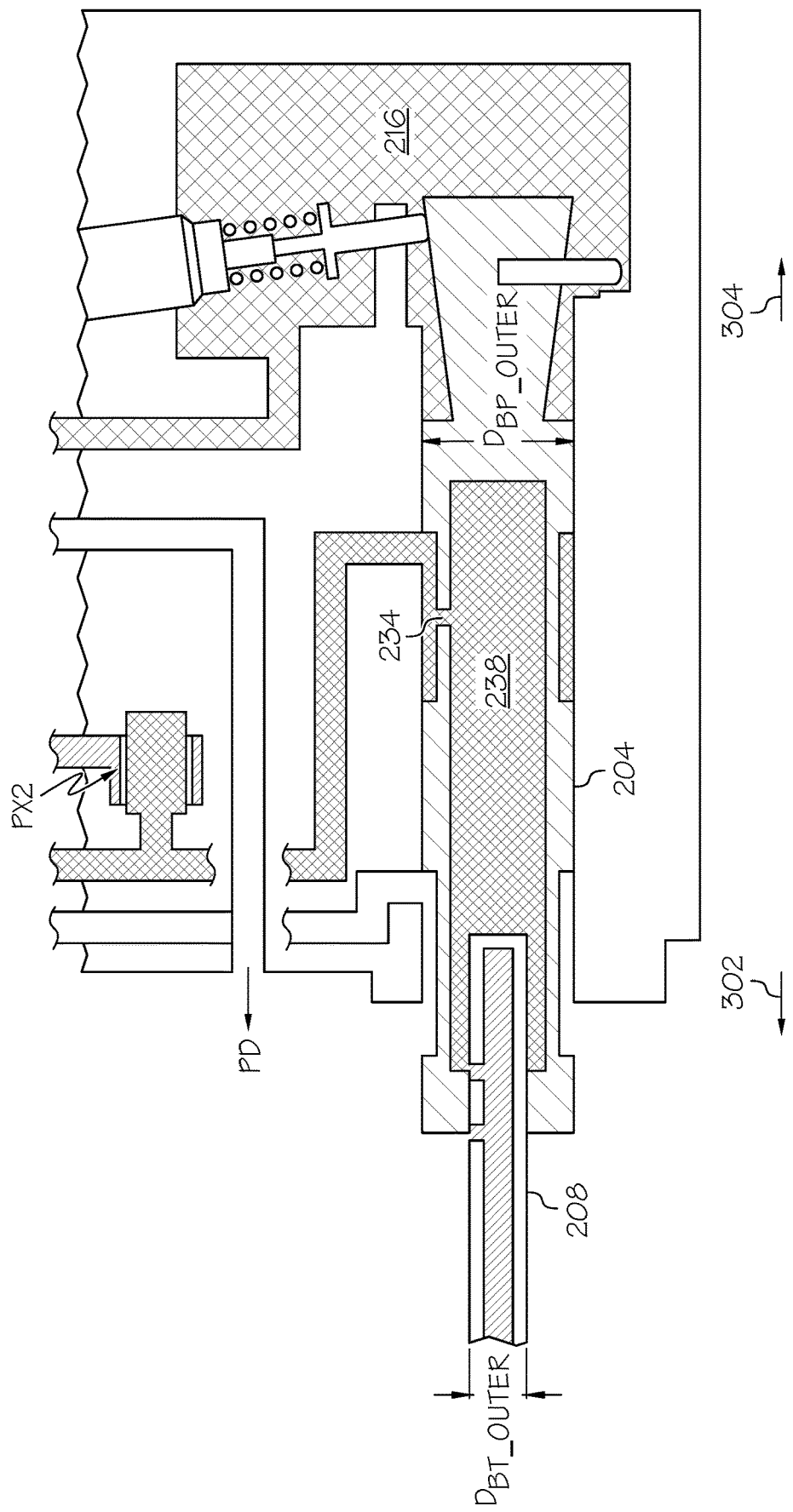
FIG. 3 depicts a close-up of a portion of the schematic representation depicted in FIG. 2.

The beta piston 204 and the beta tube 208 are configured to form a half-area force balanced architecture. To implement this architecture, and as shown more clearly in FIG. 3, the beta piston 204 has an outer diameter ($D_{BP\_OUTER}$) that defines a first area ($A_1$) and the beta tube 208 has an outer diameter ($D_{BT\_OUTER}$) that defines a second area ($A_2$). It is important to note that the beta tube 208 is disposed within the beta tube control volume 238, but it is grounded by the propeller piston 116. The beta tube 208 will move with the beta piston 204, but it is not mechanically coupled to the beta piston 204, it is only hydraulically coupled to the beta piston 204. Because of this configuration, the equivalent maximum force acting on the beta piston 204 to move it toward a more extended position (e.g., in the direction of arrow 302) is equal to the product of the fluid pressure in the control pressure chamber 216 (PX4=PX2) and a third area ($A_3$). The third area is ($A_3$) is defined as the annular area between the first and second areas (e.g., $A_3=A_1-A_2$). The equivalent maximum force simultaneously acting on the beta piston 204 to move it toward a more retracted position (e.g., in the direction of arrow 304) is equal to the product of the fluid pressure in the beta tube control volume 238 (PX2) and the second area ($A_2$). Thus, the half area architecture is set by making the second ($A_2$) and third ($A_3$) areas approximately (i.e. within 5%) equal (e.g., $A_2=A_3$). As may be appreciated, with this configuration, the beta piston 204 is in force balance when fluid pressure in the control pressure chamber 216 is approximately (i.e. within 5%) one-half of fluid pressure in the beta tube control volume 238 (e.g., PX4=(½)PX2). In addition, the maximum force available in the retracted and extended directions is equal. In this example a half-area ratio is described. This ratio could be adjusted to something other than a half-area (e.g., 40%/60% or 30%/70%) to better fit the need of the application. Changing this ratio would respectively bias the fluid pressure in control pressure chamber 216 required to move beta piston 204 toward a more extended or retracted position.

Figure 4:
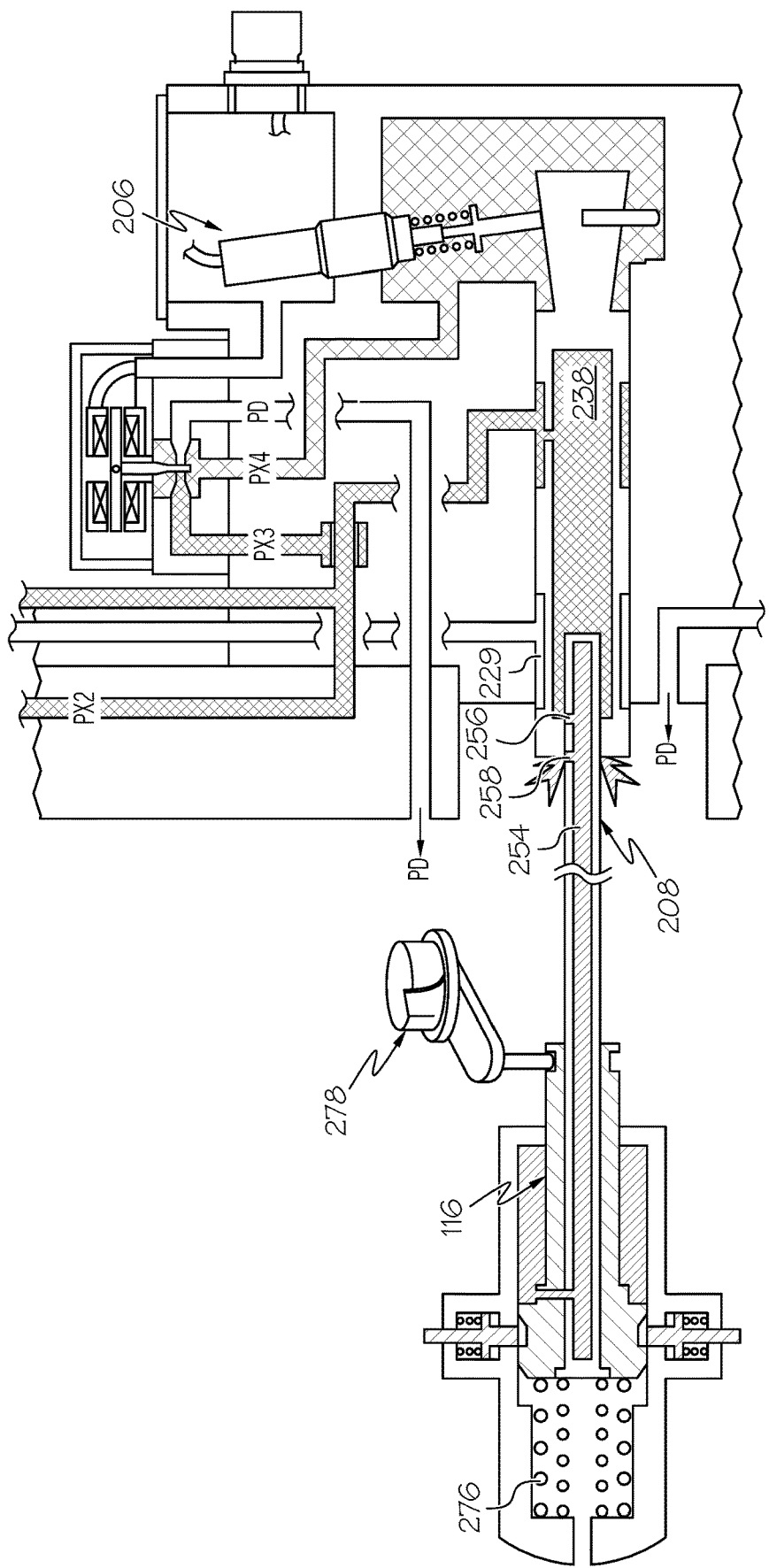
FIGS. 4-7 depict the propeller pitch control unit of FIG. 2 in different operational modes.
Figure 5:
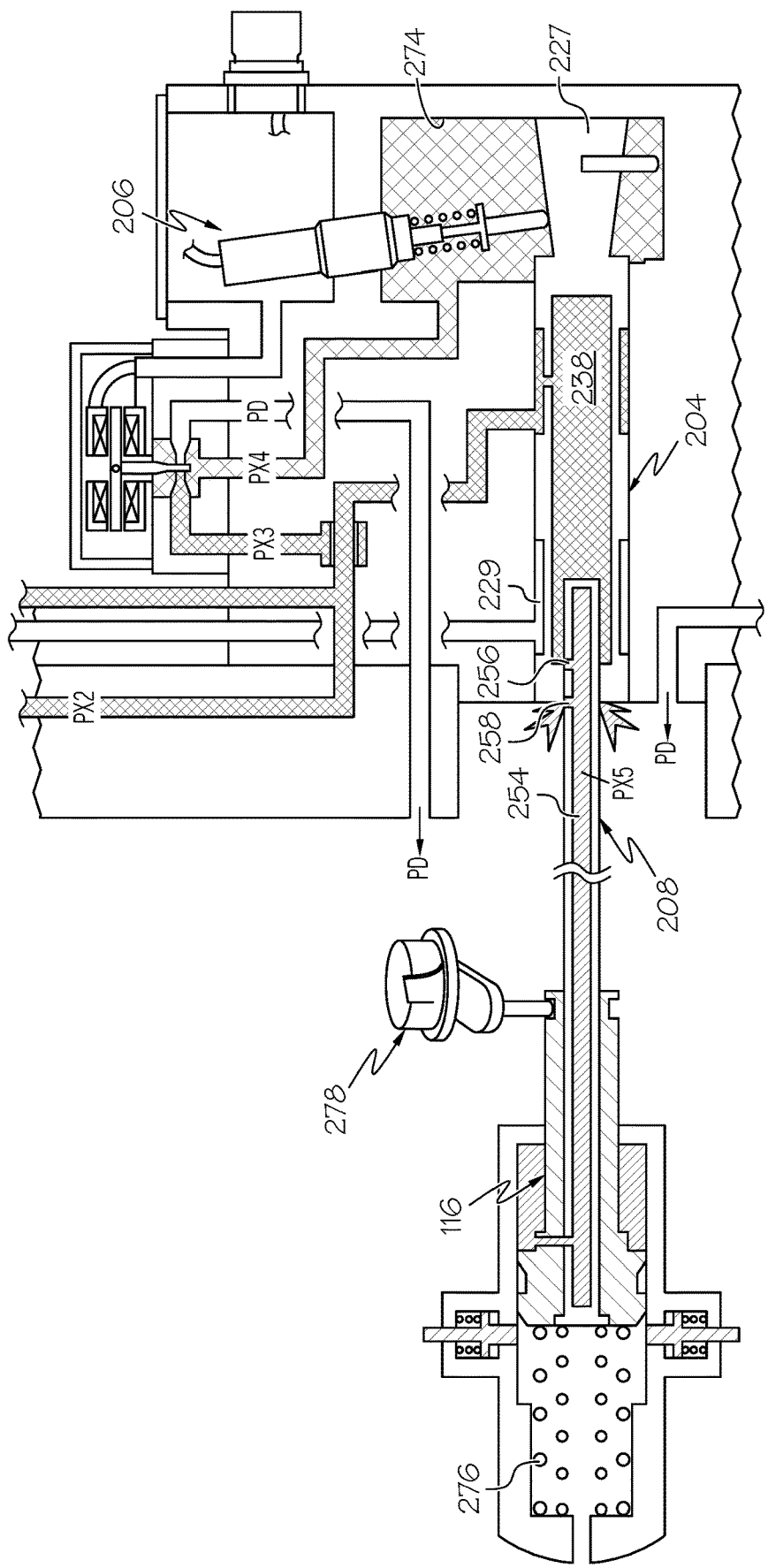
Figure 6:
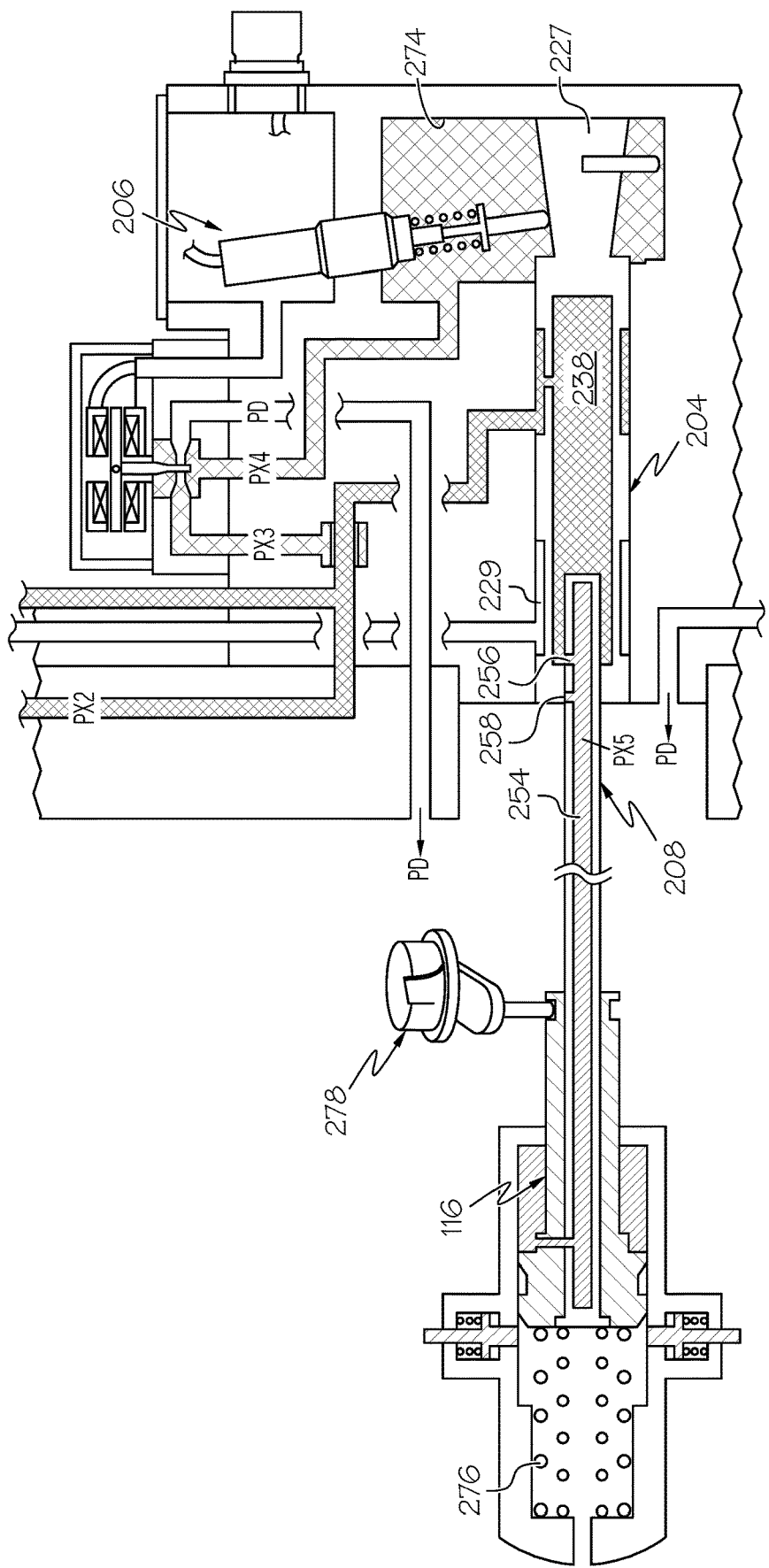
Figure 7:
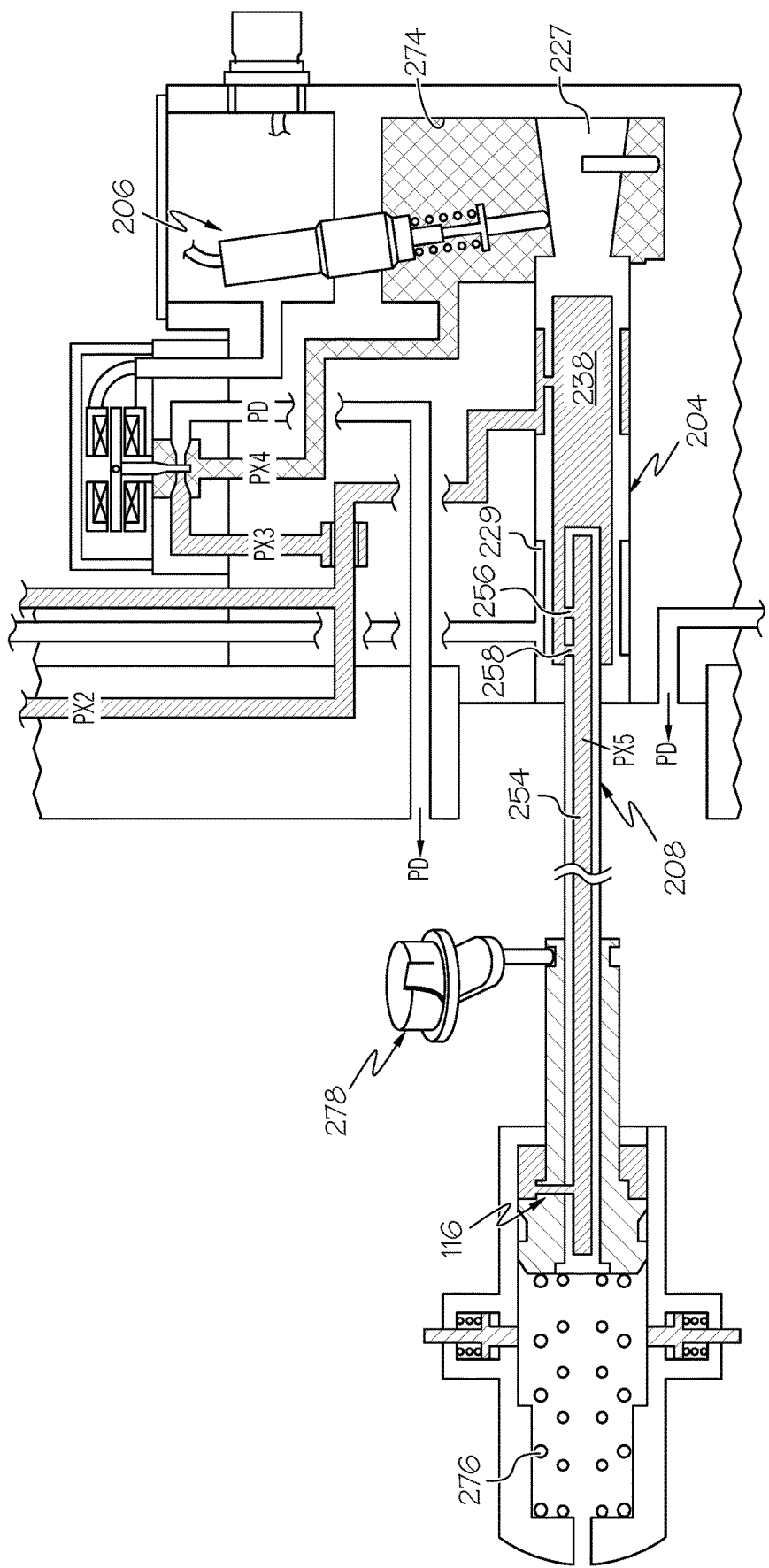

As noted above, the beta tube 208 is only hydraulically coupled to the beta piston 204. Thus, the beta piston 204 and the beta tube 208 work in conjunction to form a follow-up servo system. Basically, the fluid pressure in the propeller pitch control volume 254 (PX5) is modulated by axially moving the beta tube 208 in the beta tube control volume 238 to a plurality of positions. The plurality of positions of the beta tube 208 are defined herein as a plurality of first positions, a plurality of second positions, and a plurality of third positions. The plurality of first positions, three of which are depicted in FIGS. 2, 4, and 5, include axial positions of the beta tube 208 in which the first aperture 256 fluidly communicates the propeller pitch control volume 254 to the beta tube control volume 238, and the second aperture 258 simultaneously fluidly communicates the propeller pitch control volume 254 to atmospheric pressure. The plurality of second positions, one of which is depicted in FIG. 6, include axial positions of the beta tube 208 in which the first aperture 256 fluidly communicates the propeller pitch control volume 254 to the beta tube control volume, and the second aperture 258 is blocked. The plurality of third positions, one of which is depicted in FIG. 7, include axial positions of the beta tube 208 in which the first aperture 256 and the second aperture 258 simultaneously fluidly communicate the propeller pitch control volume 254 to the beta tube control volume 238.

The positions of the beta piston 204 and beta tube 208 are controlled by the EHV 210, which is responsive to commands supplied from the engine control unit 102. The EHV 210 is coupled to the housing 202 and includes a supply nozzle 262, a drain nozzle 264, a control pressure port 266, a movable flapper 268, and a torque motor 272. The supply nozzle 262 is in fluid communication with the inlet port 212, the drain nozzle 264 is in fluid communication with the drain pressure port 214, and the control pressure port 266 is in fluid communication with the control pressure chamber 216. The movable flapper 268 is disposed between the supply nozzle 262 and the drain nozzle 264 and is coupled to the torque motor 272.

The torque motor 272 is coupled to receive the commands supplied from the engine control unit 102. The torque motor 272 is responsive to the received commands to move the flapper 268 between the supply nozzle 262 and the drain nozzle 264 to modulate fluid pressure in the control pressure chamber 216. As may be appreciated, modulating fluid pressure in the control pressure chamber 216 results in movement of the beta piston 204. Depending, at least in part, on the fluid pressure in the control pressure chamber 216, the beta piston 204 may be moved to the fully extended position (FIG. 2), the fully retracted position (FIGS. 5-7), or any one of numerous positions between the fully extended and fully retracted positions. As FIGS. 5-7 depict, when the beta piston 204 is in the fully retracted position, the second end section 226, and more specifically the second frustoconical end 227, engages a wall 274 of the control pressure chamber 216.

It was previously noted that the engine control unit 102 only commands the EHV 210 to move the beta piston 204 from the fully retracted position when the engine control unit 102 determines the aircraft is conducting pre-takeoff roll taxiing operations or is conducting post landing touchdown operations. During these operations, the engine control unit 102 may command the propeller blades to a full reverse thrust position, a zero thrust/zero pitch position, and a flight idle pitch/positive thrust position.

To command the propeller blades to the full reverse thrust position, the electronic control unit 150 commands the EHV 210 in a manner that fluid pressure in the control pressure chamber 216 (PX4) causes the beta piston 204 to move to its fully extended position (see FIG. 2). In this position, the lockout pressure groove 229 fluidly communicates the lockout pressure port 222 to atmospheric pressure (PD). In addition, the beta tube 208 is positioned such that the first aperture 256 fluidly communicates the propeller pitch control volume 254 to the beta tube control volume 238, and the second aperture 258 simultaneously fluidly communicates the propeller pitch control volume 254 to atmospheric pressure. As a result, fluid pressure in the propeller pitch control volume 254 (PX5) causes the propeller pitch piston 116 to fully extend and the pitch piston load springs 276 to be fully compressed. This, in turn, causes the propeller blades 276 to be rotated to the full reverse thrust position.

To command the propeller blades to the zero thrust/zero pitch position (i.e., ground idle position), the electronic control unit 150 commands the EHV 210 in a manner that fluid pressure in the control pressure chamber 216 (PX4) causes the beta piston 204 to move to a partially retracted position (see FIG. 4). In this position, the lockout pressure groove 229 fluidly communicates the lockout pressure port 222 to atmospheric pressure, but via a smaller exit area (e.g., the fluid pressure is "cracked"). The beta tube 208 remains positioned such that the first aperture 256 fluidly communicates the propeller pitch control volume 254 to the beta tube control volume 238, and the second aperture 258 simultaneously fluidly communicates the propeller pitch control volume 254 to atmospheric pressure. However, the beta tube 204 position is such that fluid pressure in the propeller pitch control volume 254 (PX5) causes the propeller pitch piston 116 to be only partially retracted and the pitch piston load springs 276 to be only partially compressed. This, in turn, causes the propeller blades 276 to be rotated to the zero thrust/zero pitch position.

To command the propeller blades to the flight idle pitch/positive thrust position, the electronic control unit 150 commands the EHV 210 in a manner that fluid pressure in the control pressure chamber 216 (PX4) causes the beta piston 204 to move to its fully retracted position (see FIG. 5). In this position, the lockout pressure groove 229 fluidly isolates the lockout pressure port 222 from atmospheric pressure. Here too, the beta tube 208 remains positioned such that the first aperture 256 fluidly communicates the propeller pitch control volume 254 to the beta tube control volume 238, and the second aperture 258 simultaneously fluidly communicates the propeller pitch control volume 254 to atmospheric pressure. However, the beta tube 204 position is such that fluid pressure in the propeller pitch control volume 254 (PX5) causes the propeller pitch piston 116 to be only partially retracted and the pitch piston load springs 276 to be only partially compressed. However, the propeller pitch piston 116 is in a less extended position and the pitch piston load springs 276 are in a less compressed state, as compared to the zero thrust/zero pitch position. As a result, the propeller blades 278 are rotated to the flight idle pitch/positive thrust position.

Now, as was previously noted, when the engine control unit 102 determines the aircraft is conducting either a take-off roll or is in flight, the engine control unit 102 commands the propeller oil controller 104 and the pitch control unit 106 such that the propeller oil controller 104 modulates fluid pressure to control the position of a propeller pitch piston 116, and thus propeller blade angle, and the pitch control unit 106 is basically inactive and provides only a minimum propeller pitch stop. This configuration is depicted in FIG. 7. As this figure illustrates, that the electronic control unit 150 has commanded the EHV 210 in a manner that fluid pressure in the control pressure chamber 216 (PX4) causes the beta piston 204 to move to its fully retracted position, and to fluidly isolate the lockout pressure port 222 from atmospheric pressure. However, the beta tube 208 is positioned such that the first aperture 256 and the second aperture 258 simultaneously fluidly communicate the propeller pitch control volume 254 to the beta tube control volume 238. As a result, fluid pressure in the propeller pitch control volume 254 (PX5), and thus the position of the propeller pitch piston 116 and the angle of the propeller blades 276, are controlled by the propeller oil controller 104.

The pitch control unit described herein is configured such that beta piston size and force is minimized, beta tube thrust loads are minimized, and the axial locations of the beta piston and beta tube are linked, while propeller pitch piston force for rotating the propeller pitch blade are maximized. The pitch control unit also allows for a propeller pitch control system that does not use mechanical flyweight governors, and thus exhibits greater engine speed accuracy, reduces the likelihood for engine speed control transient overshoots, does not rely on relatively complex mechanical linkages, and does not require the same amount of routine maintenance as conventional governors.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A propeller pitch control system for a turboprop engine of an aircraft, comprising:
    an engine control unit operable to determine a phase of flight of the aircraft and configured to supply control commands; and
    a pitch control unit coupled to receive the control commands from the engine control unit, the pitch control unit comprising:
        a housing including an inlet port, a drain pressure port, a control pressure chamber, and a piston sleeve, the inlet port for receiving hydraulic fluid, the drain pressure port vented to atmospheric pressure;
        a beta piston disposed within the piston sleeve and axially movable therein between a fully extended position and a fully retracted position, the beta piston having a first end section, a second end section, an inner surface, an outer surface, and a control pressure port, at least a portion of the second end section disposed within the control pressure chamber, the second end section having an outer surface and being frustoconical in cross-section, the inner surface defining a beta tube control volume, the control pressure port extending between the inner surface and the outer surface and fluidly communicating the inlet port with the beta tube control volume;
        a position sensor having a sensor housing and a sensor shaft, the shaft extending from, and movable relative to, the housing and spring biased to continuously engage the outer surface of the second end section, whereby axial movement of the second end section causes the sensor shaft to move relative to the sensor housing;
        a beta tube disposed within the beta tube control volume and rotatable relative to the beta piston, the beta tube axially movable in the beta tube control volume based, at least in part, on fluid pressure within the beta tube control volume; and
        an electrohydraulic valve coupled to the housing and including a supply nozzle, a drain nozzle, a control pressure port, a movable flapper disposed between the supply nozzle and the drain nozzle, and a torque motor coupled to the flapper, the supply nozzle in fluid communication with the inlet port, the drain nozzle in fluid communication with the drain pressure port, the control pressure port in fluid communication with the control pressure chamber, the torque motor coupled to receive commands from the engine control unit and responsive to the commands to move the flapper between the supply nozzle and the drain nozzle to modulate fluid pressure in the control pressure chamber, to thereby move the beta piston to the fully extended position, the fully retracted position, or any one of numerous positions between the fully extended and fully retracted positions,
        wherein:
            when the beta piston is in the fully retracted position, the second end section engages a wall of the control pressure chamber, and
            the engine control unit only commands the electrohydraulic valve to move the beta piston from the fully retracted position when the engine control unit determines the aircraft is conducting pre-takeoff roll taxiing operations or is conducting post landing touchdown operations.

2. The propeller pitch control system of claim 1, wherein the beta piston and the beta tube are configured to form a half-area force balanced architecture.

3. The propeller pitch control system of claim 2, wherein:
    the beta piston has an outer diameter ($D_{BP\_OUTER}$) that defines a first area ($A_1$);
    the beta tube has an outer diameter ($D_{BT\_OUTER}$) that defines a second area ($A_2$);
    a difference between the first area ($A_1$) and the second area ($A_2$) is approximately equal to a third area ($A_3$); and
    the third area ($A_3$) is equal to the second area ($A_2$).

4. The propeller pitch control system of claim 3, wherein the beta piston is in a force balance position when fluid pressure in the control pressure chamber is approximately half of fluid pressure in the beta tube control volume.

5. The propeller pitch control system of claim 1, wherein the beta tube comprises:
    an inner surface and an outer surface, the inner surface defining a propeller pitch control volume;
    a first aperture disposed at a first axial position on the beta tube and extending between the inner surface and the outer surface; and
    a second aperture disposed at a second axial position on the beta tube extending between the inner surface and the outer surface, the second axial position spaced apart from the first axial position.

6. The propeller pitch control system of claim 5, wherein fluid pressure in the propeller pitch control volume is modulated by axially moving the beta tube in the beta tube control volume.

7. The propeller pitch control system of claim 6, wherein:
    the beta tube is axially movable in the beta tube control volume to a plurality of first positions, a plurality of second positions, and a plurality of third positions;
    the plurality of first positions include axial positions of the beta tube in which (i) the first aperture fluidly communicates the propeller pitch control volume to the beta tube control volume and (ii) the second aperture fluidly communicates the propeller pitch control volume to atmospheric pressure;
    the plurality of second positions include axial positions of the beta tube in which (i) the first aperture fluidly communicates the propeller pitch control volume to the beta tube control volume and (ii) the second aperture is blocked; and
    the plurality of third positions include axial positions of the beta tube in which the first aperture and the second aperture both fluidly communicate the propeller pitch control volume to the beta tube control volume.

8. The propeller pitch control system of claim 1, wherein the position sensor comprises a linear variable different transformer (LVDT) sensor.

9. The propeller pitch control system of claim 1, further comprising:
a slot formed in the housing;
an anti-rotation pin coupled to the second end section of the beta piston and extending into the slot, whereby rotation of the beta piston is prevented.

10. The propeller pitch control system of claim 1, wherein:
the second end section of the beta piston is defined by a first frustoconical end and a second frustoconical end;
the second end section increases in diameter from the first frustoconical end to the the second frustoconical end; and
the second frustoconical end engages a wall of the control pressure chamber when the beta piston is in the fully retracted position.

11. A propeller pitch control system for a turboprop engine of an aircraft, comprising:
an engine control unit operable to determine a phase of flight of the aircraft and configured to supply control commands; and
a pitch control unit coupled to receive the control commands from the engine control unit, the pitch control unit comprising:
a housing having a slot formed therein and including an inlet port, a drain pressure port, a control pressure chamber, and a piston sleeve, the inlet port for receiving hydraulic fluid, the drain pressure port vented to atmospheric pressure;
a beta piston disposed within the piston sleeve and axially movable therein between a fully extended position and a fully retracted position, the beta piston having a first end section, a second end section, an inner surface, an outer surface, and a control pressure port, at least a portion of the second end section disposed within the control pressure chamber, the second end section having an outer surface and being frustoconical in cross-section, the inner surface defining a beta tube control volume, the control pressure port extending between the inner surface and the outer surface and fluidly communicating the inlet port with the beta tube control volume;
an anti-rotation pin coupled to the second end section of the beta piston and extending into the slot, whereby rotation of the beta piston is prevented;
a position sensor having a sensor housing and a sensor shaft, the shaft extending from, and movable relative to, the housing and spring biased to continuously engage the outer surface of the second end section, whereby axial movement of the second end section causes the sensor shaft to move relative to the sensor housing;
a beta tube disposed within the beta tube control volume and rotatable relative to the beta piston, the beta tube axially movable in the beta tube control volume based, at least in part, on fluid pressure within the beta tube control volume; and
an electrohydraulic valve coupled to the housing and including a supply nozzle, a drain nozzle, a control pressure port, a movable flapper disposed between the supply nozzle and the drain nozzle, and a torque motor coupled to the flapper, the supply nozzle in fluid communication with the inlet port, the drain nozzle in fluid communication with the drain pressure port, the control pressure port in fluid communication with the control pressure chamber, the torque motor coupled to receive commands from the engine control unit and responsive to the commands to move the flapper between the supply nozzle and the drain nozzle to modulate fluid pressure in the control pressure chamber, to thereby move the beta piston to the fully extended position, the fully retracted position, or any one of numerous positions between the fully extended and fully retracted positions,
wherein:
the beta piston, the piston sleeve, and the beta tube are configured to form a half-area force balanced architecture,
when the beta piston is in the fully retracted position, the second end section engages a wall of the control pressure chamber, and
the engine control unit only commands the electrohydraulic valve to move the beta piston from the fully retracted position when the engine control unit determines the aircraft is conducting pre-takeoff roll taxiing operations or is conducting post landing touchdown operations.

12. The propeller pitch control system of claim 11, wherein:
the beta piston has an outer diameter ($D_{BP\_OUTER}$) that defines a first area ($A_1$);
the beta tube has an outer diameter ($D_{BT\_OUTER}$) that defines a second area ($A_2$);
a difference between the first area ($A_1$) and the second area ($A_2$) is approximately equal to a third area ($A_3$); and
the third area ($A_3$) is equal to the second area ($A_2$).

13. The propeller pitch control system of claim 12, wherein the beta piston is in a force balance position when fluid pressure in the control pressure chamber is approximately half of fluid pressure in the beta tube control volume.

14. The propeller pitch control system of claim 11, wherein the beta tube comprises:
an inner surface and an outer surface, the inner surface defining a propeller pitch control volume;
a first aperture disposed at a first axial position on the beta tube and extending between the inner surface and the outer surface; and
a second aperture disposed at a second axial position on the beta tube extending between the inner surface and the outer surface, the second axial position spaced apart from the first axial position.

15. The propeller pitch control system of claim 14, wherein fluid pressure in the propeller pitch control volume is modulated by axially moving the beta tube in the beta tube control volume.

16. The propeller pitch control system of claim 15, wherein:
the beta tube is axially movable in the beta tube control volume to a plurality of first positions, a plurality of second positions, and a plurality of third positions;
the plurality of first positions include axial positions of the beta tube in which (i) the first aperture fluidly communicates the propeller pitch control volume to the beta tube control volume and (ii) the second aperture fluidly communicates the propeller pitch control volume to atmospheric pressure;
the plurality of second positions include axial positions of the beta tube in which (i) the first aperture fluidly communicates the propeller pitch control volume to the beta tube control volume and (ii) the second aperture is blocked; and the plurality of third positions include axial positions of the beta tube in which the first aperture and the second aperture both fluidly communicate the propeller pitch control volume to the beta tube control volume.

17. The propeller pitch control system of claim 11, wherein the position sensor comprises a linear variable different transformer (LVDT) sensor.

18. The propeller pitch control system of claim 11, wherein:
the second end section of the beta piston is defined by a first frustoconical end and a second frustoconical end;
the second end section increases in diameter from the first frustoconical end to the the second frustoconical end; and
the second frustoconical end engages a wall of the control pressure chamber when the beta piston is in the fully retracted position.

19. A propeller pitch control unit, comprising:
a housing including an inlet port, a drain pressure port, a control pressure chamber, and a piston sleeve, the inlet port for receiving hydraulic fluid, the drain pressure port vented to atmospheric pressure;
a beta piston disposed within the piston sleeve and axially movable therein between a fully extended position and a fully retracted position, the beta piston having an outer diameter ($D_{BP\_OUTER}$) that defines a first area ($A_1$) and including a first end section, a second end section, an inner surface, an outer surface, and a control pressure port, at least a portion of the second end section disposed within the control pressure chamber, the inner surface defining a beta tube control volume, the control pressure port extending between the inner surface and the outer surface and fluidly communicating the inlet port with the beta tube control volume; and
a beta tube disposed within the beta tube control volume and rotatable relative to the beta piston, the beta tube axially movable in the beta tube control volume based, at least in part, on fluid pressure within the beta tube control volume, the beta tube having an outer diameter ($D_{BT\_OUTER}$) that defines a second area ($A_2$), wherein:
a difference between the first area ($A_1$) and the second area ($A_2$) is approximately equal to a third area ($A_3$), and
the third area ($A_3$) is equal to the second area ($A_2$).

20. The propeller pitch control unit of claim 19, wherein the beta piston is in a force balance position when fluid pressure in the control pressure chamber is approximately half of fluid pressure in the beta tube control volume.

* * * * *